April 29, 1952  J. GRENDA  2,594,426
DEVICE FOR HANDLING MOWERS
Filed Aug. 11, 1950  2 SHEETS—SHEET 1

INVENTOR.
JOSEPH GRENDA,
BY
McMorrow, Berman & Davidson
ATTORNEYS.

April 29, 1952 J. GRENDA 2,594,426
DEVICE FOR HANDLING MOWERS
Filed Aug. 11, 1950 2 SHEETS—SHEET 2
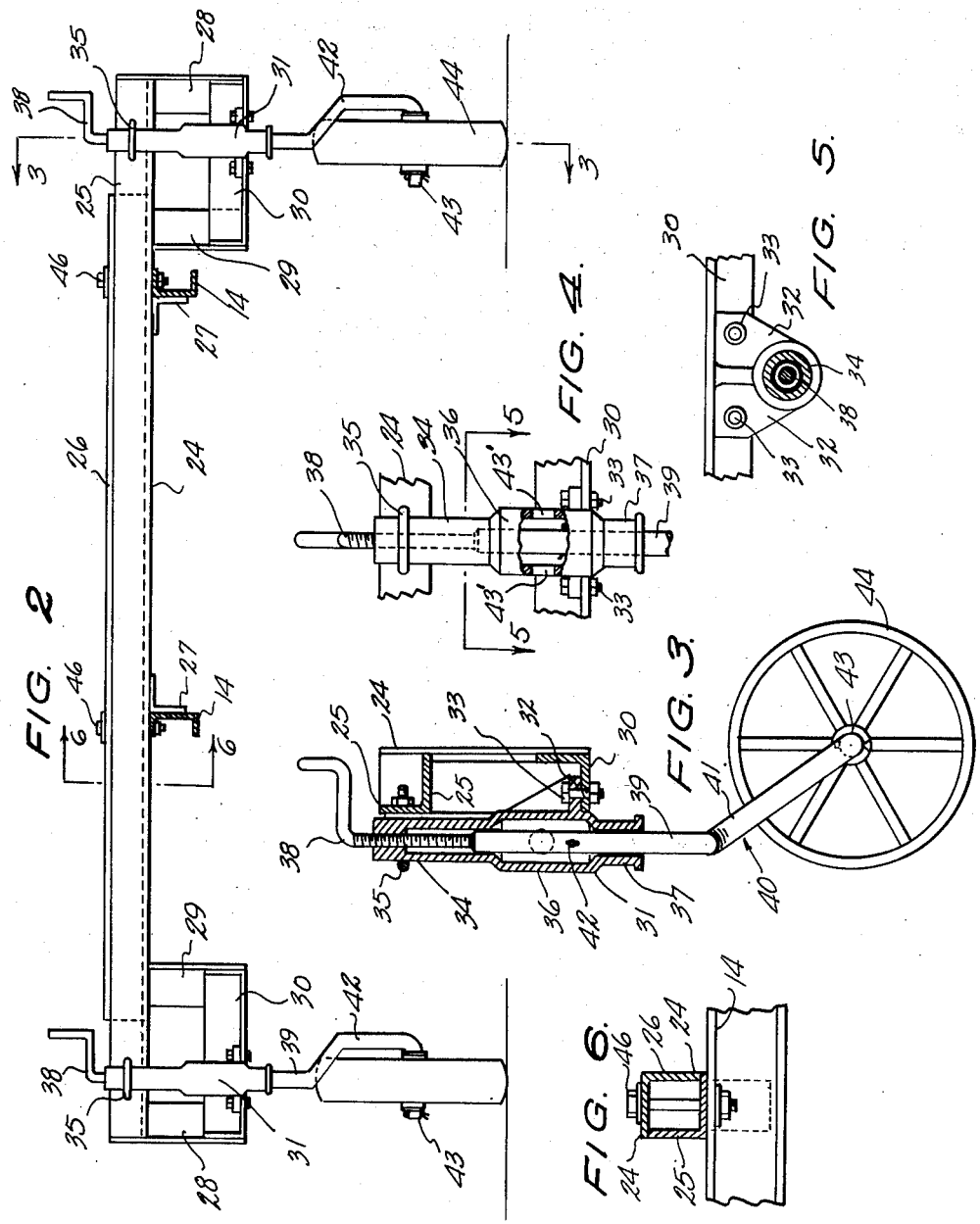
INVENTOR.
JOSEPH GRENDA,
BY
McMorrow, Berman & Davidson
ATTORNEYS.

Patented Apr. 29, 1952

2,594,426

UNITED STATES PATENT OFFICE 2,594,426

DEVICE FOR HANDLING MOWERS

Joseph Grenda, Coldbrook, N. Y.

Application August 11, 1950, Serial No. 178,877

3 Claims. (Cl. 280—44)

1

This invention relates to agricultural implements, and more particularly to a device for moving a mowing machine so that it may be attached to a tractor or detached from the tractor.

The main object of the invention is to provide a novel and improved apparatus for handling a mowing attachment for a tractor, said apparatus being simple in construction, being easily handled by only one man, and involving only a few parts.

A further object of the invention is to provide an improved device for handling a mowing attachment of the type adapted to be hitched to a tractor, the device being relatively inexpensive to manufacture, being sturdy in construction, being easy to operate, and greatly reducing the time and labor required to attach a mower to a tractor.

Further objects and advantages of the invention will become apparent from the following description and claims, and from the accompanying drawings, wherein:

Figure 2 is a cross sectional detail view somewhat enlarged in scale, taken on the line 2—2 of Figure 1.

Figure 3 is an enlarged cross sectional detail view taken on line 3—3 of Figure 2.

Figure 4 is an enlarged fragmentary elevational detail view, partly in cross section, showing one of the swivel sleeves employed in the apparatus of the present invention.

Figure 5 is a cross sectional detail view taken on the line 5—5 of Figure 4.

Figure 6 is an enlarged cross sectional detail view taken on line 6—6 of Figure 2.

Figure 1:
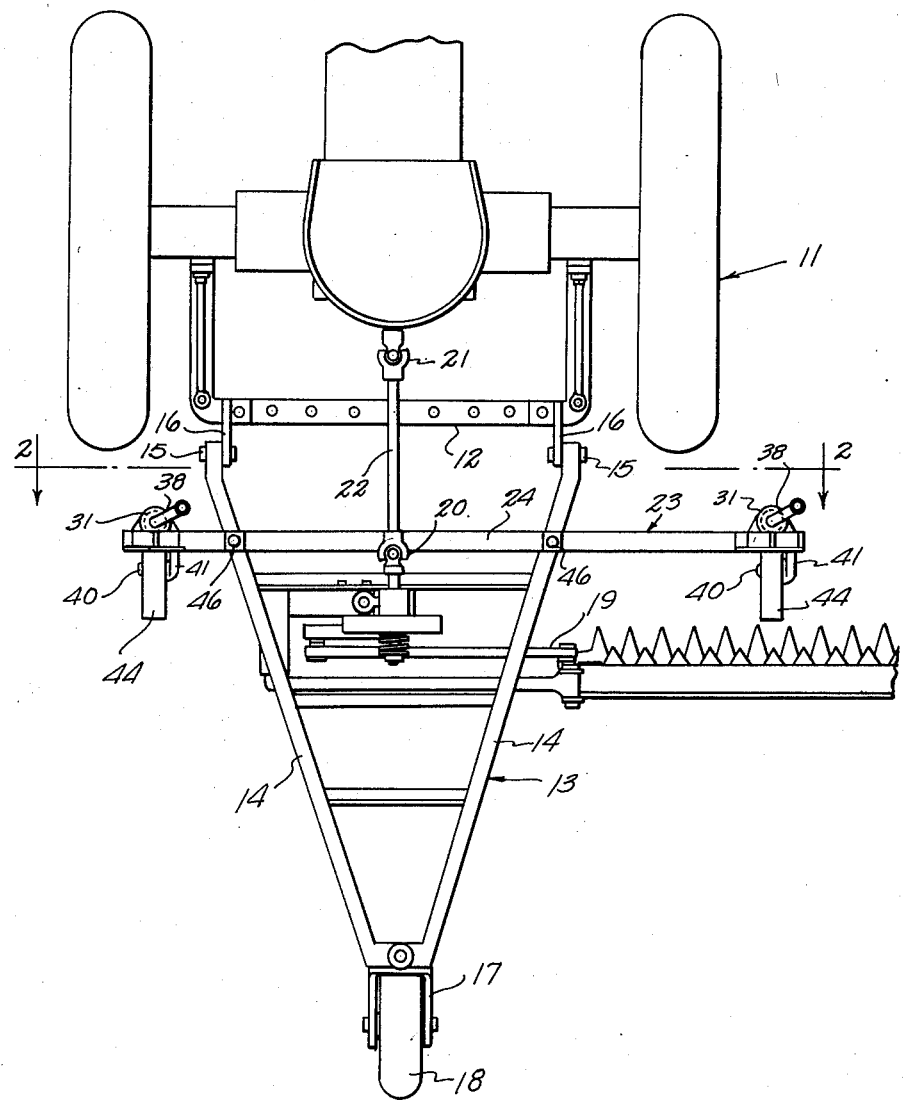
Figure 1 is a top plan view of the rear portion of a tractor showing a mowing attachment hitched thereto and mounted on an improved handling apparatus constructed in accordance with the present invention.

Referring to the drawings, and more particularly to Figure 1, 11 designates a conventional tractor having a rear hitch bar 12, and 13 generally designates a conventional mower attachment for the tractor, said attachment having the rearwardly convergent frame bars 14, 14 whose forward ends may be pivotally secured, at 15, 15 to rearwardly projecting lugs 16, 16 carried by the hitch bar 12. The junction of the frame bars 14, 14 has swivelly secured thereto a caster 17 provided with the ground engaging wheel 18. The mower mechanism is generally designated at 19 and is supported in a conventional manner on the frame bars 14, 14. The driving shaft of the mower mechanism is connected to the power takeoff shaft of the tractor by the universal joints 20 and 21 and the transmission shaft 22, as shown in Figure 1.

In order to attach the rear ends of the frame members 14, 14 to the lugs 16, 16 it is necessary to elevate the mower frame so that the rear ends of the frame bars 14, 14 will be in registry with

2 the ends of the lugs 16, 16. Registration of the rear ends of the frame bars 14 with the lugs 16 is required in order to insert the pivot bolts 15 to connect the frame bars to the lugs. Designated generally at 23 is an apparatus for moving the mower attachment and for elevating the rear ends of the frame bars 14, 14 into the required positions of registry with the lugs 16, 16. The apparatus 23 comprises an elongated main bar member 24, which may comprise a first angle bar 25 and a second angle bar 26 welded over the first angle bar to form a box shaped cross section, as shown in Figure 6. Welded to the under side of the angle bar 25 at spaced locations on its horizontal flange are the respective angle brackets 27, 27 adapted to fit inside the frame bars 14, 14 in the manner shown in Figure 2 so as to properly locate the main bar member 24 over the frame bars 14, 14.

Secured to each end portion of the main bar member 24 by the respective pairs of depending angle bar sections 28, 29 are the respective short horizontal angle bar sections 30 extending parallel to the respective end portions of the main bar member 24. Designated at 31, 31 are respective sleeve members which are vertically secured to the respective horizontal bar members 30, 30, in the manner shown in Figure 3. As shown in Figure 3, each sleeve member is provided with a pair of flange elements 32, 32 overlapping and secured on the horizontal flange of a bar member 30 by the respective bolts 33, 33. The top portion of each sleeve member 31, designated at 34 is clamped to the main bar member 24 by a U bolt 35 which extends through the vertical flange of the angle bar 25, as shown in Figure 3. Each sleeve member 31 has a relatively enlarged intermediate portion 36. The lower portion of each sleeve member is designated at 37. Threaded through the top wall of the upper portion 34 of each sleeve member is a crank rod 38. Rotatably and slidably positioned in each sleeve member 31 is the vertical top shaft portion 39 of a caster designated generally at 40. The caster 40 comprises the rod member 41 which is formed at its top portion with the vertical shaft element 39 and which is offset, as shown at 42, and which terminates at its bottom portion in the horizontal shaft element 43. Rotatably mounted on the shaft element 43 is a ground engaging wheel 44. As shown in Figure 3, the top end of the vertical shaft portion 39 is in abutment with the bottom end of the crank rod 38, and by rotating said crank rod the degree of insertion of the shaft member 39 in the sleeve 31 may be adjusted. The vertical shaft portion 39 has a cotter pin 42 extending through its intermediate portion to prevent the shaft portion from being removed from the sleeve member 31. Access to said cotter pin may be obtained through opposing openings 43', 43' formed in the enlarged intermediate sleeve portion 36.

To use the device, the apparatus is wheeled over the mower frame and is positioned in transversely overlying relation to the frame bars 14, 14 with the angle brackets 27, 27 positioned over the inwardly facing surfaces of the frame bars 14, 14. The main bar member 24 is then lowered by means of the crank rods 38, 38 to bring the main bar 24 into contact with the top surfaces of the frame bars 14, 14. The top flanges of the frame bars 14 and the main bar 24 are provided with registrable openings adapted to receive a securing bolt 46. The apparatus is moved so that said openings are in registry and the bolt 46 is then extended through the openings and a nut is threaded onto the bolt to secure the main bar member 24 to each frame bar 14. The apparatus together with the mowing attachment may then be moved to a position adjacent to the rear portion of the tractor 11 wherein the rear ends of frame bars 14, 14 are disposed beneath the lugs 16, 16, and the crank bars 38 are then manipulated to bring the openings in the rear ends of the frame bars into registry with the openings in the lugs 16, 16. When such registry has been achieved, the bolts 15, 15 are inserted and suitable nuts are threaded on said bolts to complete the attachment of the mower to the tractor.

While a specific embodiment of an improved handling device for attaching a mower to a tractor has been disclosed in the foregoing description, it will be understood that various modifications within the spirit of the invention may occur to those skilled in the art. Therefore it is intended that no limitation be placed on the invention except as defined by the scope of the appended claims.

What is claimed is:

1. A mower-elevating device comprising an elongated main bar member adapted to be secured at its intermediate portion transversely to a mower frame, respective smaller bar members secured to the main bar member below and vertically spaced from the end portions of said main bar member, respective vertical sleeve members at the end portions of said main bar member, means rigidly securing each sleeve member to a smaller bar member and to the end portion of the main bar member above said smaller bar member, respective casters at said end portions of the main bar member, the top portion of each caster being solid and being slidably and rotatably received in a sleeve member, and respective crank rods threaded through the top portions of the sleeve members and directly abutting the top portions of the casters received therein.

2. A mower-elevating device comprising an elongated main bar member adapted to be secured at its intermediate portion transversely to a mower frame, respective smaller bar members secured to the main bar member below and spaced vertically from the end portions of said main bar member, respective vertical sleeve members at the end portions of said main bar member, means rigidly securing each sleeve member to a smaller bar member and to the end portion of the main bar member above said smaller bar member, respective casters at said end portions of the main bar member, each caster having a supporting bracket formed with a solid vertical top shaft, said top shaft being slidably and rotatably received in a sleeve member, and respective crank rods threaded through the top portions of the sleeve members and directly abutting the top ends of the shaft received therein.

3. A mower-elevating device comprising an elongated main bar member adapted to be arranged transversely to a mower frame, a pair of spaced depending lugs on the inner portion of said bar member adapted to be secured to said frame, respective smaller bar members secured to the main bar member below and vertically spaced from the end portions of said main bar member, respective vertical sleeve members at the end portions of said main bar member, means rigidly securing each sleeve member to a smaller bar member and to the end portion of the main bar member above said smaller bar member, respective casters at the end portions of the main bar member, each caster comprising a rod formed with a solid vertical top shaft portion, a horizontal bottom shaft portion, and a caster wheel journaled on said horizontal shaft portion, the top shaft portion being slidably and rotatably received in a sleeve member, and respective crank rods threaded through the top portions of the sleeve members and directly abutting the top ends of the vertical shaft portions.

JOSEPH GRENDA.

REFERENCES CITED

The following references are of record in the file of this patent:

UNITED STATES PATENTS

| Number | Name | Date |
|---|---|---|
| 1,056,128 | Schuett | Mar. 18, 1913 |
| 1,340,416 | Schneider | May 18, 1920 |
| 2,008,445 | Goodsman | July 16, 1935 |